Patented Dec. 4, 1934

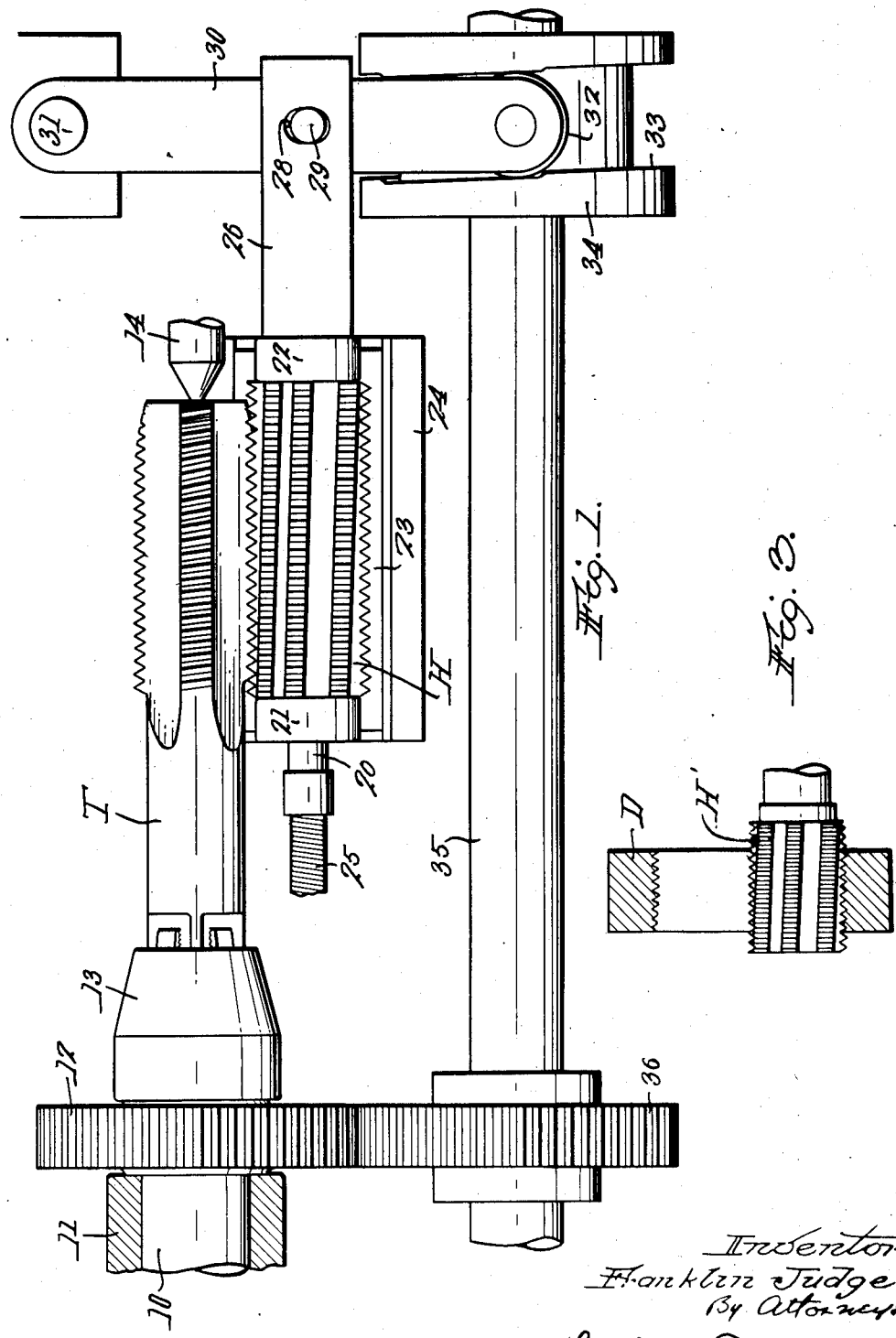

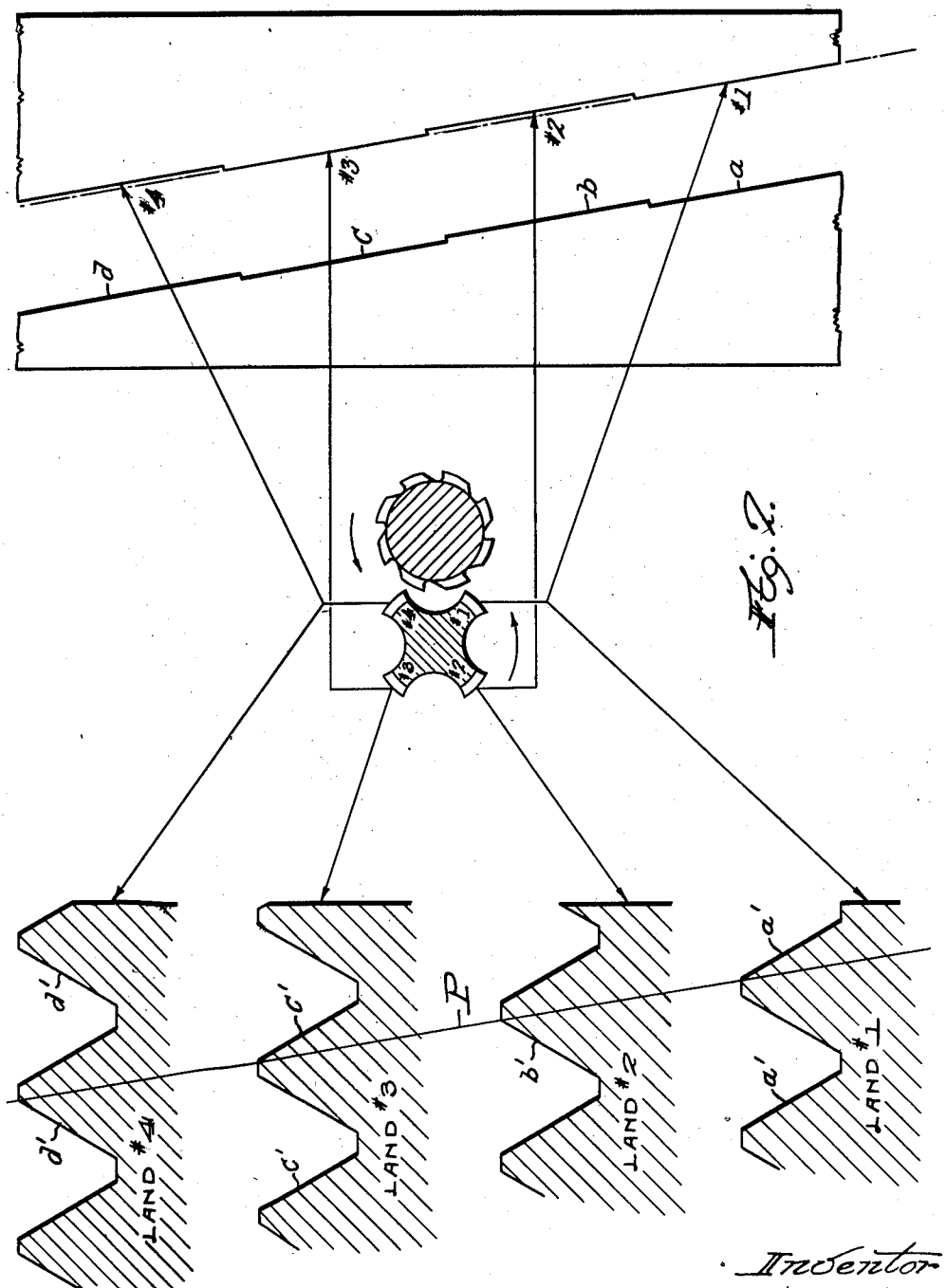

1,982,736

UNITED STATES PATENT OFFICE 1,982,736

APPARATUS FOR MAKING A TAP

Franklin Judge, Greenfield, Mass., assignor to Greenfield Tap & Die Corporation, Greenfield, Mass., a corporation of Massachusetts Application November 30, 1931, Serial No. 578,038
Renewed May 11, 1934

5 Claims. (Cl. 10—154)

This invention relates to taps having successive cutting teeth offset axially on opposite sides of the normal helix line.

In the preferred form, all of the teeth on one land of the tap are offset on one side of the helix line and all of the teeth on the next successive land of the tap are offset on the opposite side.

A tap having these defined characteristics is shown and described in my prior application Serial No. 555,951, filed August 8, 1931.

My present invention relates to an improved method of manufacturing such taps and to improved apparatus for use in such manufacture.

My invention further relates to certain arrangements and combinations of parts and to certain ordered procedure which will be hereinafter described and more particularly pointed out in the appended claims.

A preferred form of apparatus adapted for carrying out my improved method is shown in the drawings, in which Fig. 1 is a plan view of portions of a tap hobbing machine designed to produce my improved taps;

Fig. 2 is a diagrammatic view illustrating the operation of the machine and the detail steps of the method; and Fig. 3 is a detail view showing the application of my improved method to the production of dies.

Referring to Fig. 1, I have shown portions of a tap hobbing machine including a spindle 10 rotatable in a bearing 11 and provided with a gear 12 and chuck or driver 13. A tap T is secured in the chuck 13 and the opposite end of the tap may be supported on a tail center 14.

A hob H is supported on a shaft or spindle 20, rotatable in bearings 21 and 22 on a support 23 longitudinally slidable in guide-ways in a stand 24. The spindle 20 and hob H may be rotated in any convenient manner, as by a flexible shaft 25.

The stand 24 may be adjusted toward and from the work by any suitable mechanism, whereby a cut of the desired depth will be taken.

An arm 26 projects outward from one end of the slide or support 23 and has a slot 28 to receive a stud 29 mounted in a lever 30. The lever 30 swings about a fixed pivot stud 31 and is provided with a cam roll 32 positioned in the peripheral cam groove 33 of a cam 34, mounted on a countershaft 35. The shaft 35 is provided with a gear 36 engaging the gear 12 previously described. These gears are preferably of the same size, so that the cam 34 makes one revolution for each rotation of the tap T.

The side walls of the cam groove 33 are disposed at a slight helical angle relative to the axis of the shaft 35, which angle corresponds to the pitch of the desired thread on the tap T.

In the process of manufacture, the hob H is rotated at a suitable cutting speed and the tap T is simultaneously rotated at relatively slow speed. Consequently the teeth of the hob H form a series of grooves in a selected land of the tap T and these grooves and the intervening teeth are formed at the desired pitch angle by reason of the gradual axial adjustment or shifting of the hob, effected by the helical cam groove 33 as the cam 34 rotates in unison with the rotation of the tap T.

The apparatus as thus far described may be used to produce ordinary taps not having my alternately offset teeth.

In order to produce this alternate offsetting of the teeth by the hobbing operation, I modify the cam groove 33 as indicated in Fig. 2.

The portion $a$ of the cam groove is used for producing the teeth on the land 1, which teeth are offset to the left with reference to the helix line P, providing clearance on the face $a'$.

When the teeth on the land 1 have been hobbed and the hob is out of contact with the tap, the cam groove is axially offset or shifted slightly to the right, as indicated at $b$, thereby causing the teeth on the land 2 to be offset to the right of the normal helix line P, with clearance as indicated at $b'$. The cam groove is then shifted back to produce a portion $c$ in helical alignment with the portion $a$ previously described and this portion produces the teeth of the land 3, with clearance on the right hand side as indicated at $c'$.

The cam groove is then again offset or shifted to the right, as indicated at $d$, thereby producing the teeth of the land 4, with clearance on their left hand faces as indicated at $d'$.

The cam groove 33 then drops abruptly back to its original position, after completion of the teeth on the land 4, and the parts are promptly returned to a relation where the cam roll 32 is again located in the initial cam portion $a$.

I am thus able to produce the alternately offset teeth shown in my prior application, with all of the advantages therein described, by the use of a thread hobbing machine for regular taps. When in use, the machine operates exactly as in the production of regular taps. Consequently the production of my specially offset taps requires no extra operations and involves no increased expense.

The carrying out of my improved method is not necessarily dependent on the use of the apparatus shown, as other mechanism may be used, or the relative axial movement of the hob or tap may be effected manually. Obviously, it is immaterial whether the hob or the tap is shifted, so long as relative axial movement occurs.

In Fig. 3, I have shown the relation of the parts for hobbing a die D by a hob H' projecting into the opening in the die. Relative axial shifting of the hob and die may be used to produce relatively offset teeth in the die D in the same manner as in the production of taps as previously described.

The invention may be applied to the production of three-land taps by hobbing one land in a normal helix line, relatively shifting the hob and tap axially in one direction to cause the teeth of the next land to be offset at one side of said normal helix line, and then relatively shifting the hob and tap to cause the teeth of the third land to be offset at the opposite side of the normal helix line. In this case, the axial shift between the second and third lands may be the normal amount of shift used in two or four flute, commonly about .003", while the shift between the first and second lands, or between the third and first, will be only one-half as much.

Having described my improved method or process and a form of apparatus by which the method may be carried out, I do not wish to be limited to the details herein disclosed, otherwise than as set forth in the claims, but what I claim is:—

1. A machine for hobbing threading tools having cutting teeth disposed in a plurality of circumferentially spaced and axially extended lands, having in combination, separate means to rotatably support the work and a hob in operative relation, automatic means to relatively move the hob and work axially during a hobbing operation to maintain a certain helix line relation, and automatic means to relatively shift said hob and work axially slightly out of said first helix line relation after the teeth of one land have been hobbed, and to maintain said shifted relation during the hobbing of the next land, whereby the teeth on two successive lands are axially offset relatively to each other.

2. A machine for hobbing threading tools having cutting teeth disposed in a plurality of circumferentially spaced and axially extended lands, having in combination, separate means to rotatably support the work and a hob in operative relation, a cam, and mechanism controlled thereby effective to move said hob and work relatively axially during a hobbing operation, thereby maintaining said parts in a certain helix line relation during the hobbing of one land, said cam having certain operative portions offset to automatically produce a slight relative axial shifting of the hob and work out of said helix relation after the hobbing of the teeth of one land has been completed and before the hobbing of the next successive land is commenced.

3. A machine for hobbing threading tools having cutting teeth disposed in a plurality of circumferentially spaced and axially extended lands, having in combination, separate means to rotatably support the work and a hob in operative relation, a cam, and mechanism controlled thereby effective to move said hob and work relatively axially during a hobbing operation, thereby maintaining said parts in a certain helix line relation during the hobbing of one land, said cam having a cam groove disposed substantially in a helical path but having the portions of said groove corresponding to certain lands slightly offset axially out of the normal helical path of said cam, thereby automatically slightly offsetting the teeth on said certain lands axially, relatively to the teeth on the remaining lands.

4. A machine for hobbing threading tools having cutting teeth disposed in a plurality of circumferentially spaced and axially extended lands, having in combination, separate means to rotatably support the work and a hob in operative relation, automatic means to progressively change the axial relation of the hob and work during a hobbing operation to maintain a primary helix line relation, automatic means to effect an additional abrupt slight axial change in the relative positions of said hob and work between the hobbing of successive lands of the work, whereby the teeth in said successive lands are slightly offset relatively to each other, and means to thereafter restore the primary helix line relation.

5. A machine for hobbing threading tools having cutting teeth disposed in a plurality of circumferentially spaced and axially extended lands, having in combination, separate means to rotatably support the work and a hob in operative relation, means to progressively change the axial relation of the hob and work during a hobbing operation to maintain a certain helix line relation, and automatic means to effect successive abrupt axial changes in the relative positions of said hob and work between the hobbing of successive lands of the work, whereby the teeth in successive lands are slightly offset relatively to each other, said additional changes in relative axial position being made alternately in opposite directions.

FRANKLIN JUDGE.